United States Patent
Stanek et al.

(10) Patent No.: US 11,706,580 B2
(45) Date of Patent: Jul. 18, 2023

(54) MULTI-INPUT PUSH-TO-TALK SWITCH WITH BINAURAL SPATIAL AUDIO POSITIONING

(71) Applicant: OTTO ENGINEERING, INC., Carpentersville, IL (US)

(72) Inventors: Daniel F. Stanek, Chicago, IL (US); Bernard L. Knych, Arlington Heights, IL (US); Brian Prorok, Elgin, IL (US); Eric Growney, Naperville, IL (US)

(73) Assignee: OTTO ENGINEERING, INC., Carpentersville, IL (US)

( * ) Notice: Subject to any disclaimer, the term of this patent is extended or adjusted under 35 U.S.C. 154(b) by 83 days.

(21) Appl. No.: 17/363,421

(22) Filed: Jun. 30, 2021

(65) Prior Publication Data

US 2022/0141607 A1    May 5, 2022

Related U.S. Application Data

(60) Provisional application No. 63/108,721, filed on Nov. 2, 2020.

(51) Int. Cl.
| | |
|---|---|
| *H04S 1/00* | (2006.01) |
| *H04R 5/033* | (2006.01) |
| *H04W 4/10* | (2009.01) |
| *H04S 7/00* | (2006.01) |

(52) U.S. Cl.
CPC ............. *H04S 1/007* (2013.01); *H04R 5/033* (2013.01); *H04S 7/308* (2013.01); *H04W 4/10* (2013.01); *H04S 2420/01* (2013.01)

(58) Field of Classification Search
CPC ...... H04S 1/007; H04S 7/308; H04S 2420/01; H04R 5/033; H04W 4/10
USPC ............................................................ 381/1
See application file for complete search history.

(56) References Cited

U.S. PATENT DOCUMENTS

| | | | |
|---|---|---|---|
| 2015/0181355 A1* | 6/2015 | Pedersen | H04R 25/40 381/313 |
| 2017/0295278 A1* | 10/2017 | Lyren | H04S 7/304 |
| 2020/0137509 A1* | 4/2020 | Stanek | H04S 7/303 |

OTHER PUBLICATIONS

International Search Report and Written Opinion of the ISA for Int'l Application No. PCT/US21/39917 dated Oct. 5, 2021, 10 pages.

\* cited by examiner

*Primary Examiner* — Paul Kim
(74) *Attorney, Agent, or Firm* — McAndrews, Held & Malloy, Ltd.

(57) ABSTRACT

Various embodiments provide a multi-audio input, stereo audio output, push-to-talk (PTT) switch device. The device may include an audio processing unit configured to perform spatial separation/positioning for one or a plurality of audio sources. The audio processing unit of the device may apply unique head-related transfer functions (HRTFs) to produce left and right audio outputs that correspond to predetermined or dynamically positioned spatial locations for each of the incoming audio streams.

23 Claims, 3 Drawing Sheets

MULTI-INPUT PUSH-TO-TALK SWITCH WITH BINAURAL SPATIAL AUDIO POSITIONING

CROSS-REFERENCE TO RELATED APPLICATIONS/INCORPORATION BY REFERENCE

The present application claims priority under 35 U.S.C. § 119(e) to provisional application Ser. No. 63/108,721 filed on Nov. 2, 2020, entitled "MULTI-INPUT PUSH-TO-TALK SWITCH WITH BINAURAL SPATIAL AUDIO POSITIONING," which is hereby incorporated herein by reference in its entirety.

FIELD

Certain embodiments relate to the audio communications systems. More specifically, certain embodiments relate to a multi-audio input, stereo audio output, push-to-talk (PTT) switch device configured to spatially position each of a plurality of unique incoming audio streams.

BACKGROUND

Persons tasked to monitor and manage multiple audio communications channels are often wearing binaural headsets either for privacy, for hearing protection, or because they need to communicate in a noisy environment. These people may begin to experience cognitive overload when faced with more than two simultaneous audio streams. Traditional methods allow separation of two incoming audio streams into the left and right ear, but when faced with three or more audio sources, the audio channels are mixed together in either one or both ears. The user may become overwhelmed and mentally fatigued trying identify, comprehend, and separate the unique audio streams.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A multi-audio input, stereo audio output, push-to-talk (PTT) switch device configured to spatially position each of a plurality of unique incoming audio streams is provided, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

DETAILED DESCRIPTION

Figure 1:
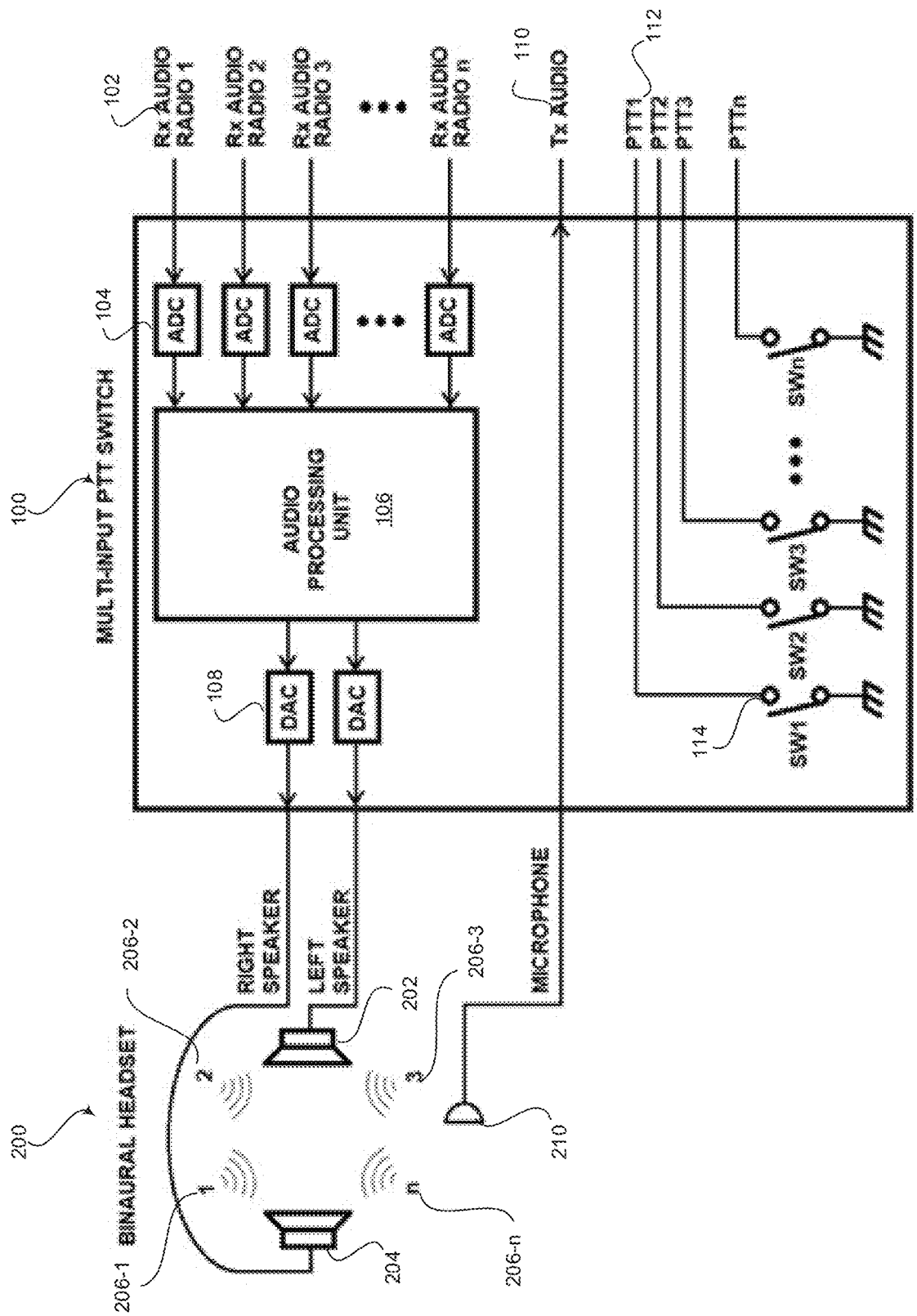
FIG. 1 is a block diagram of an exemplary multi-audio input, stereo audio output, push-to-talk (PTT) switch device configured to spatially position each of a plurality of unique incoming audio streams, in accordance with various embodiments.

Certain embodiments may be found in systems, methods, and devices configured to spatially position each of a plurality of unique incoming audio streams. Aspects of the present disclosure are directed to a multi-audio input, stereo audio output, push-to-talk (PTT) switch device configured to spatially position each of a plurality of unique incoming audio streams. The multi-audio input, stereo audio output, push-to-talk (PTT) switch device may spatially position each of the plurality of unique incoming audio streams by applying unique head-related transfer functions (HRTFs) corresponding to spatial locations for each of the incoming audio streams to create a user perception that each of the incoming audio streams originates from the respective spatial location.

The foregoing summary, as well as the following detailed description of certain embodiments will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (e.g., processors or memories) may be implemented in a single piece of hardware (e.g., a general purpose signal processor or a block of random access memory, hard disk, or the like) or multiple pieces of hardware. Similarly, the programs may be stand alone programs, may be incorporated as subroutines in an operating system, may be functions in an installed software package, and the like. It should be understood that the various embodiments are not limited to the arrangements and instrumentality shown in the drawings. It should also be understood that the embodiments may be combined, or that other embodiments may be utilized and that structural, logical and electrical changes may be made without departing from the scope of the various embodiments of the present disclosure. The following detailed description is, therefore, not to be taken in a limiting sense, and the scope of the present disclosure is defined by the appended claims and their equivalents.

As used herein, an element or step recited in the singular and proceeded with the word "a" or "an" should be understood as not excluding plural of said elements or steps, unless such exclusion is explicitly stated. Furthermore, references to "an embodiment," "one embodiment," "a representative embodiment," "an exemplary embodiment," "various embodiments," "certain embodiments," and the like are not intended to be interpreted as excluding the existence of additional embodiments that also incorporate the recited features. Moreover, unless explicitly stated to the contrary, embodiments "comprising," "including," or "having" an element or a plurality of elements having a particular property may include additional elements not having that property.

Furthermore, the term controller, processor, or processing unit, as used herein, refers to any type of processing unit that can carry out the required calculations needed for the disclosure, such as single or multi-core: CPU, DSP, FPGA, ASIC or a combination thereof.

FIG. 1 is a block diagram of an exemplary multi-audio input, stereo audio output, push-to-talk (PTT) switch device 100 configured to spatially position 206-1, 206-2, 206-3, 206-*n*, at a headset 200 having speakers 202, 204, and a microphone 210, each of a plurality of unique incoming audio streams 102, in accordance with various embodiments. In a representative embodiment, a multiple-input audio push-to-talk (PTT) switch device used in radio communications systems is implemented as a junction to connect multiple radios to a single user's communications headset 200 or earbuds. Corresponding PTT switch buttons 112 on the PTT switch device 100 independently activate each radio's transmit function and allows the user to transmit audio from a connected microphone 210 through any of the connected radios. In tactical situations, users are often carrying multiple radios that allow them to engage in conversations with multiple groups or with other users operating on different radio frequencies. In these situations, users connect a single microphone 210 to a multi-input PTT switch device 100 that is connected to one or more radios. The multiple-input PTT switch device 100 comprises multiple electrical PTT switch buttons 112 that close a corresponding PTT switch 114 to activate the transmit feature of the corresponding connected radios as well as an audio processing unit 106 that receives one or multiple digital audio inputs 102 and produces two processed digital audio outputs with unique processing for each of the left and right ear.

Referring to FIG. 1, the multi-audio input, stereo audio output, push-to-talk (PTT) switch device 100 comprises audio inputs 102, analog-to-digital converters (ADCs) 104, an audio processing unit 106, digital-to-analog converters (DACs) 108, audio outputs (to left and right speakers), a microphone input, a transmitter output 110, PTT switch buttons 112, and PTT switches 114. The incoming audio streams 102 may be provided, for example, from one or more audio sources, such as a smartphone, land mobile radio (LMR), intercom, a public broadcast channel from television, radio, or Internet, a synthesized audio or alert tone (e.g., alerts or information), or the like.

The ADCs 104 may comprise suitable logic, circuitry, interfaces and/or code that may be operable to convert the incoming analog audio streams 102 from the one or more audio sources to corresponding digital audio streams, which are provided to the audio processing unit 106. The ADCs 104 may disposed between the audio input connectors and the audio processing unit 106. Notwithstanding, the embodiments are not limited in this regard. Accordingly, in some embodiments, the ADCs 104 may be integrated within the audio input connectors and/or the audio processing unit 106.

The audio processing unit 106 may comprise suitable logic, circuitry, interfaces and/or code that may be operable to process the received digital audio streams to spatially position each of a plurality of unique incoming audio streams 102. The audio processing unit 106 may comprise suitable logic, circuitry, interfaces and/or code that may be operable to spatially position each of the plurality of unique incoming audio streams 102 by applying unique head-related transfer functions (HRTFs) corresponding to spatial locations 206-1, 206-2, 206-3, 206-n for each of the incoming audio streams 102 to create a user perception that each of the incoming audio streams 102 originates from the respective spatial location 206-1, 206-2, 206-3, 206-n. The audio processing unit 106 may be configured to output the spatially positioned audio streams as left and right digital audio output streams. The audio processing unit 106 may be configured to add spectral content for band-limited audio. In various embodiments, the audio processing unit 106 applying the unique HRTFs may be implemented in software via digital signal processing and/or in hardware. For example, for fixed spatial locations and a fixed number of audio streams, audio processing circuitry, instead of or in addition to digital signal processing, may provide the time, frequency, and phase delays to produce the left and right speaker signals.

The spatial locations 206-1, 206-2, 206-3, 206-n for each of the incoming audio streams may be selected based on user selection, an association between physical connectors and spatial locations, a spatial positioning algorithm, priority codes included with the received audio streams, and/or any suitable selection criteria. For example, each of the incoming audio streams 102 may be provided at a spatial location 206-1, 206-2, 206-3, 206-n based on a physical connection to a specific audio input connector of the PTT switch device 100. As another example, a user may set the spatial locations 206-1, 206-2, 206-3, 206-n in 360-degrees in both vertical and horizontal planes. The user may set the spatial locations 206-1, 206-2, 206-3, 206-n based on a perceived distance from the user. The spatial locations 206-1, 206-2, 206-3, 206-n for each of the incoming audio streams may be provided at default fixed positions reconfigurable by the user. The spatial locations 206-1, 206-2, 206-3, 206-n for each of the incoming audio streams may be programmed by the user on the PTT switch device 100. Additionally and/or alternatively, the user selection of the spatial locations 206-1, 206-2, 206-3, 206-n may be application driven. The application may comprise a user interface residing on a remote device, such as a smartphone or a personal computer, communicating with the audio processor 106 via a wired or wireless data connection. As another example, the spatial locations 206-1, 206-2, 206-3, 206-n for each of the incoming audio streams 102 may be defined by radios that are mated to the PTT switch device 100, such as based on a priority level specified by the radio. For example, the audio processing unit 106 may be configured to recognize a priority code included with a received input audio stream 102 and assign a spatial location 206-1, 206-2, 206-3, 206-n, such as directly above a user, based on the priority code. A priority level protocol may established and transmitted by an audio source either as a separate digital data transmission or as an audio preamble on the audio channel including a tone, sequence of tones, voice, or voice-like burst, which is decoded by the audio processor to establish priority and assign spatial locations based on the priority level. Priority designation may also involve raising the audio volume for high priority audio streams while keeping other audio streams at a nominal level. As another example, the audio processing unit 106 may comprise suitable logic, circuitry, interfaces and/or code that may be operable to dynamically allocate spatial locations 206-1, 206-2, 206-3, 206-n based on a spatial positioning algorithm. The spatial positioning algorithm may allocate the spatial locations 206-1, 206-2, 206-3, 206-n based on the number of audio inputs being received at any one time. The spatial positioning algorithm may be configured to assign new spatial locations 206-1, 206-2, 206-3, 206-n for each subsequent audio source connected to the PTT switch device 100. Additionally and/or alternatively, the spatial positioning algorithm may be configured to provide a maximum audio positional separation between the audio input streams 102. For example, two audio input streams 102 may be placed at left and right, front and back, or up and down for maximum audio positional separation. As another example, three audio input streams 102 may be presented in a triangle configuration in three-dimensional space (e.g., left, right, and above; back-left, back-right, and front; or, the like). Additionally, four audio input streams 102 may be presented in a square configuration in three-dimensional space (e.g., left, right, above, and below; left, right, front, and back; front-left, front-right, back-left, and back-right; or, the like).

In various embodiments, the audio processing unit 106 may comprise suitable logic, circuitry, interfaces and/or code that may be operable to place the spatial audio positioning into, or cycle through, different modes by the user. For example, the different modes may include maximizing spatial separation of the incoming audio streams spherically, positioning all audio streams in the forward hemisphere, amplifying certain select audio streams over others, normalizing all incoming audio streams so they are perceived in equal volume, turning off spatial audio localization, or the like. In an exemplary embodiment, the audio processing unit 106 may comprise suitable logic, circuitry, interfaces and/or code that may be operable to run a user initiated training sequence where synthesized audio (e.g., "radio 1", "radio 2", "radio 3", etc.) is processed to sequentially spatially emanate from the established spatial locations for the incoming audio streams thereby allowing the user to confirm the audio stream spatial location settings and orient themselves ahead of when the live audio arrives.

The audio processing unit 106 may comprise suitable logic, circuitry, interfaces and/or code that may be operable to utilize unique head-related transfer functions (HRTFs) corresponding to spatial locations 206-1, 206-2, 206-3, 206-$n$ for each of the incoming audio streams 102 to create a user perception that the audio originates from those spatial locations 206-1, 206-2, 206-3, 206-$n$. For example, a pair of head-related transfer function (HRTFs) unique for left and right ear may be used to synthesize a binaural sound that is perceived to come from a particular point in space. The HRTFs for left and right ear describe the filtering that takes place to a sound source (x(t)) before it is perceived at the left and right ears as xL(t) and xR(t), respectively. A HRTF characterizes how an ear receives a sound from a point in space. As sound strikes the listener, the size and shape of the head, ears, ear canal, density of the head, size and shape of nasal and oral cavities, all transform the sound and affect how it is perceived, boosting some frequencies and attenuating others. All these characteristics influence how (or whether) a listener can accurately tell what direction a sound is coming from. HRTFs can vary significantly from person to person. To get the most precise spatial perception of audio, unique HRTFs would be generated for each unique user, but doing so is often not practical, so it is generally easier to implement audio spatialization using "ideal" HRTFs measured using a "dummy head" of idealized geometry.

In certain embodiments, the method used to obtain the HRTF for sound from a given source location is to measure the head-related impulse response (HRIR), h(t), at the ear drum (measured for a "dummy head" of idealized geometry) for the impulse Δ(t) placed at the source. The HRTF H(f) is the Fourier transform of the HRIR h(t). HRTFs are functions of frequency and spatial variables. HRTF, H(f, θ, φ).

Typically, sounds generated from headphones appear to the listener as if they originate from within the head. To position the audio to appear to emanate from a point in space, the headphones externalize the sound. Using a HRTF, sounds can be spatially positioned to be perceived to emanate from a point in space using the technique described below.

Assume x1(t) represents an electrical signal driving a loudspeaker producing sound from a particular direction toward a listener, and y1(t) represents the signal received by a microphone inside the listener's eardrum. Similarly, assume x2(t) represent the electrical signal driving a headphone speaker and y2(t) represents the signal received by a microphone inside the listener's ear drum. The goal of spatial audio positioning is to modify x2(t) such that y2(t)=y1(t).

Applying Fourier transforms to these signals provides the following two equations:

$$Y1 = x1 LFM, \text{ and } Y2 = x2 HM$$

where:
L is the transfer function of the loudspeaker,
F is the HRTF,
M is the microphone transfer function,
H is the headphone-to-eardrum transfer function.
Setting Y1=Y2, and solving for X2 yields $$X2 = x1 LF/H.$$

Therefore, the desired transfer function is:

$$T = LF/H.$$

If x1(t) is passed through this filter and the resulting x2(t) is played on the headphones, it produces the same signal at the eardrum. Since the filter applies only to a single ear, another filter is derived for the other ear. This process is repeated for many places in the virtual environment to create an array of head-related transfer functions for each position to be recreated.

Although certain embodiments in the description may describe the audio processing unit 106 disposed in the multi-input PTT switch device 100, unless so claimed, the scope of various aspects of the present invention should not be limited to the audio processing unit 106 disposed in the multi-input PTT switch device 100. For example, the audio processing unit 106 may additionally and/or alternatively reside inside the headset 200 with multiple wired or wireless audio inputs connecting directly to the radios. As another example, the audio processing unit 106 can be incorporated into a cellphone, radio, smart device, PC, call center console, a dashboard inside a vehicle or aircraft, or any device that has built in processing capability and the ability to input multiple audio streams and to output a stereo (independent left and right) audio stream.

Still referring to FIG. 1, the audio processing unit 106 may comprise suitable logic, circuitry, interfaces and/or code that may be operable to perform a hearing test to customize the unique HRTFs based on an ability of a user to spatially localize sound and a unique head and ear morphology of the user. The audio processing unit 106 may comprise suitable logic, circuitry, interfaces and/or code that may be operable to add custom frequency equalization to compensate for hearing loss of the user, thereby improving spatial positioning for those users and ultimately reducing cognitive loading for those users.

The DACs 108 may comprise suitable logic, circuitry, interfaces and/or code that may be operable to convert the left and right digital audio output streams from the audio processing unit 106 to corresponding left and right analog audio output streams, which are provided to the respective left speaker 202 and right speaker 204 of the headset 200. The DACs 108 may disposed between the audio processing unit 106 and the audio output connectors. Notwithstanding, the embodiments are not limited in this regard. Accordingly, in some embodiments, the DACs 108 may be integrated within the audio processing unit 106, the audio output connectors, and/or the headset 200.

The audio output streams are output at left 202 and right 204 speakers of a headset 200, earphones, or the like. The headset 200 may comprise a microphone 210 configured to convert sound to electrical signals and provide a microphone input of the PTT switch device 100 with the electrical signals for transmission when the PTT switch device 100 is in transmit mode. Corresponding PTT switch buttons 112 on the PTT switch device 100 may be configured to independently activate each radio's transmit function and allow the user to transmit audio from the connected microphone 210 through any of the connected radios via PTT switches 114.

Various embodiment allow a user to mentally compartmentalize each of a plurality of streams of audio 102 through a mental three-dimensional (3D) map by spatially positioning 206-1, 206-2, 206-3, 206-*n* each unique audio stream using head-related transfer functions (HRTFs) and digital signal processing (DSP) techniques. Even as the unique audio streams 102 are output concurrently, the human brain may focus on audio arriving from a particular direction in space and mentally "tune out" audio coming from other directions. The spatially positioned audio streams allow the user to prioritize and independently focus attention on the informational content of each audio stream. The human ability to "tune in" and "tune out" audio based on spatial direction allows the user to monitor the collective of all the audio streams and selectively focus on audio streams that may become high priority.

Figure 2:
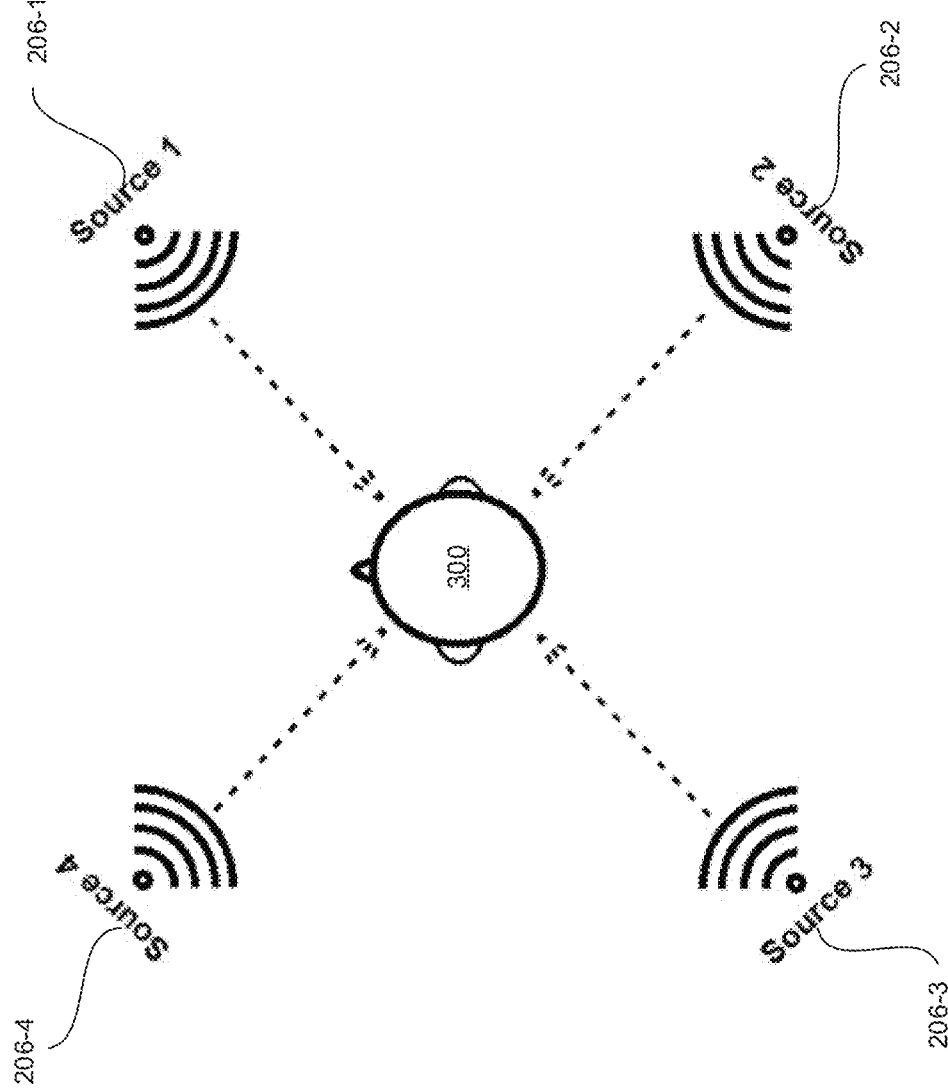
FIG. 2 is a diagram of an exemplary configuration of a predefined spatial positioning for four (4) audio sources, in accordance with various embodiments.

FIG. 2 is a diagram of an exemplary configuration of a predefined spatial positioning for four (4) audio sources, in accordance with various embodiments. Referring to FIG. 2, four audio sources 206-1, 206-2, 206-3, 206-4 are shown with maximum separation around a user 300. In various embodiments, the system may accommodate any number (n) of audio sources 206.

Figure 3:
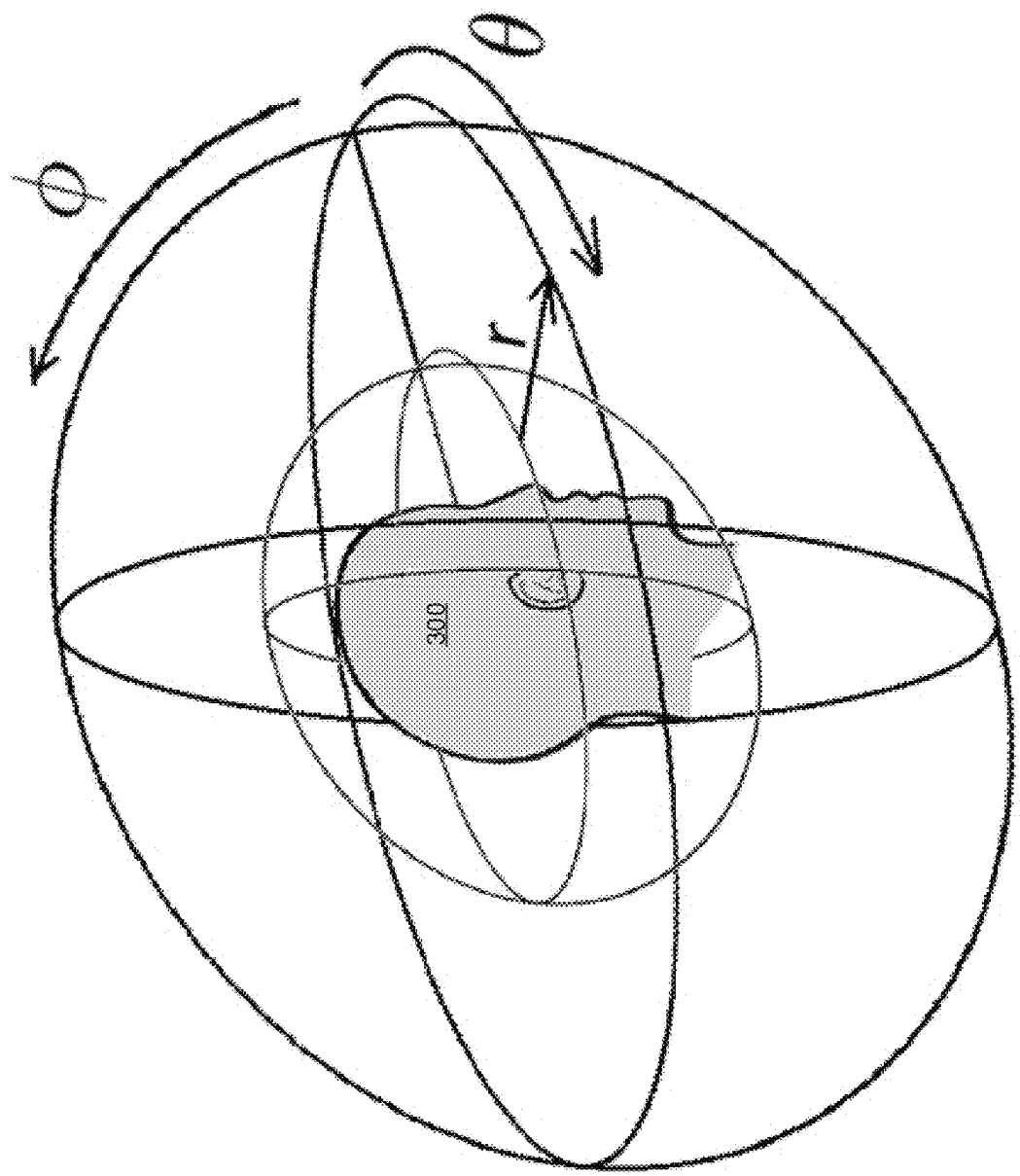
FIG. 3 is a diagram of exemplary three-dimensional (3D) view of user customizable spatial audio positioning, in accordance with various embodiments.

FIG. 3 is a diagram of exemplary three-dimensional (3D) view of user customizable spatial audio positioning, in accordance with various embodiments. Referring to FIG. 3, the user 300 may customize the spatial audio positioning provided by the audio processing unit 106 in 360 degrees in the horizontal plane, 360 degrees in the vertical plane, and a perceived distance (r) from the user 300.

Certain embodiments may additionally and/or alternatively include visual and/or physical spatial location feedback. For example, re-enforcing visual cues may be provided in addition to the spatial location of the audio streams via augmented reality glasses or the like. As another example, re-enforcing physical clues may be provided in addition to the spatial location of the audio streams via haptic transducers mounted in the ear cups of the stereo headset, the head band, or head gear, such as a hat or helmet. The haptic transducers may be configured to provide haptic cues to supplement the spatial location of the audio streams.

Aspects of the present disclosure provide a system 100, 200 configured to spatial separate/position a plurality of incoming audio streams 102. The system 100, 200 may comprise a plurality of incoming audio connectors each configured to receive an incoming audio stream 102 from a different one of a plurality of audio sources. The system 100, 200 may comprise an audio processing unit 106 configured to apply unique head-related transfer functions (HRTFs) to the incoming audio stream 102 received from each of the plurality of incoming audio connectors to produce a left audio output and a right audio output that positions each of the incoming audio stream 102 received from each of the plurality of incoming audio connectors at different spatial locations 206-1, 206-2, 206-3, 206-4, 206-*n*. The system 100, 200 may comprise a left speaker 202 and a right speaker 204 operable to convert and output the respective left audio output and right audio output as binaural sound.

In an exemplary embodiment, the plurality of incoming audio connectors and the audio processing unit 106 reside in a push-to-talk (PTT) switch device 100. In a representative embodiment, the plurality of incoming audio connectors and the audio processing unit 106 reside in a computing device comprising one of a cellphone, a radio, a smart device, a personal computer, a call center console, or a dashboard inside a vehicle or aircraft. In various embodiments, the plurality of incoming audio connectors and the audio processing unit 106 reside in a stereo communications headset 200. In certain embodiments, at least one of the plurality of incoming audio connectors is a wireless receiver. In an exemplary embodiment, at least one of the plurality of incoming audio connectors is a wired connector.

In a representative embodiment, each of the different spatial locations 206-1, 206-2, 206-3, 206-4, 206-*n* is a predetermined spatial location. In various embodiments, each of the different spatial locations 206-1, 206-2, 206-3, 206-4, 206-*n* corresponds with a different one of the plurality of incoming audio connectors. In certain embodiments, each of the different spatial locations 206-1, 206-2, 206-3, 206-4, 206-*n* is selectable by user control in 360-degrees in both vertical and horizontal planes. In an exemplary embodiment, each of the different spatial locations 206-1, 206-2, 206-3, 206-4, 206-*n* is selectable by user control based on a perceived distance from a user 300. In a representative embodiment, each of the different spatial locations 206-1, 206-2, 206-3, 206-4, 206-*n* is provided at default fixed positions reconfigurable by user control. In various embodiments, each of the different spatial locations 206-1, 206-2, 206-3, 206-4, 206-*n* is selectable by user control via an application comprising a user interface residing on a remote device communicating with the audio processor. In certain embodiments, at least one of the different spatial locations 206-1, 206-2, 206-3, 206-4, 206-*n* is defined by at least one of the plurality of audio sources. In certain embodiments, the at least one of the plurality of audio sources is configured to include a priority level with the incoming audio stream 102. The audio processing unit 106 may be configured to assign the at least one of the different spatial locations 206-1, 206-2, 206-3, 206-4, 206-*n* based on the priority level.

In various embodiments, the plurality of incoming audio connectors and the audio processing unit 106 reside in a PTT switch device 100. Each of the different spatial locations 206-1, 206-2, 206-3, 206-4, 206-*n* may be a predetermined spatial location. The PTT switch device 100 may be programmable by a user to define each of the different spatial locations 206-1, 206-2, 206-3, 206-4, 206-*n*. In certain embodiments, the audio processing unit 106 is configured to dynamically allocate each of the different spatial locations 206-1, 206-2, 206-3, 206-4, 206-*n*. In an exemplary embodiment, the audio processing unit 106 is configured to dynamically allocate each of the different spatial locations 206-1, 206-2, 206-3, 206-4, 206-*n* based on a number of the incoming audio stream 102 received at any one time. In a representative embodiment, the audio processing unit 106 is configured to dynamically allocate each of the different spatial locations 206-1, 206-2, 206-3, 206-4, 206-*n* by defining a primary audio position of the different spatial locations 206-1, 206-2, 206-3, 206-4, 206-*n* when only one of the plurality of audio sources is present and subsequently assigning new positions of the different spatial locations 206-1, 206-2, 206-3, 206-4, 206-*n* for each subsequently connected one of the plurality of audio sources. In various embodiments, the audio processing unit 106 is configured to dynamically allocate each of the different spatial locations 206-1, 206-2, 206-3, 206-4, 206-n based on a maximum audio positional separation. In certain embodiments, the plurality of audio sources comprises at least one of a smartphone, a land mobile radio (LMR), an intercom, or a public broadcast channel from TV, Radio, or Internet. In an exemplary embodiment, the audio processing unit 106 is configured to add spectral content for band-limited audio to the incoming audio stream 102. In an exemplary embodiment, the audio processing unit 106 is configured to perform a hearing test to customize the unique HRTFs based on an ability of a user to spatially localize sound and a unique head and ear morphology of the user. In a representative embodiment, the audio processing unit 106 is configured to add custom frequency equalization to compensate for hearing loss of the user. In various embodiments, the audio processing unit 106 configured to apply the unique HRTFs is implemented in hardware.

As utilized herein the term "circuitry" refers to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. As another example, "x, y, and/or z" means any element of the seven-element set {(x), (y), (z), (x, y), (x, z), (y, z), (x, y, z)}. As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry or other structure is "operable" or "configured" to perform a function whenever the circuitry or other structure comprises the necessary hardware and code (if any is necessary) to perform the function, regardless of whether performance of the function is disabled, or not enabled, by some user-configurable setting.

Other embodiments of the disclosure may provide a computer readable device and/or a non-transitory computer readable medium, and/or a machine readable device and/or a non-transitory machine readable medium, having stored thereon, a machine code and/or a computer program having at least one code section executable by a machine and/or a computer, thereby causing the machine and/or computer to perform the steps as described herein for spatially positioning each of a plurality of unique incoming audio streams.

Accordingly, the present disclosure may be realized in hardware, software, or a combination of hardware and software. The present disclosure may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present disclosure may also be embedded in a computer program product, which comprises all the features enabling the implementation of the methods described herein, and which when loaded in a computer system is able to carry out these methods. Computer program in the present context means any expression, in any language, algorithm, code or notation, of a set of instructions intended to cause a system having an information processing capability to perform a particular function either directly or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments falling within the scope of the appended claims.

What it claimed is:

1. A system comprising:
   a bi-directional audio communication device communicatively coupled with a plurality additional bi-directional audio communication devices, wherein the bi-directional audio communication device comprises:
   a plurality of incoming audio connectors, each of the plurality of incoming audio connectors configured to receive an incoming audio stream from at least one of the plurality of additional bi-directional audio communication devices; and
   an audio processing unit configured to apply unique head-related transfer functions (HRTFs) to the incoming audio stream received from each of the plurality of incoming audio connectors to produce a left audio output and a right audio output that positions each of the incoming audio stream received from each of the plurality of incoming audio connectors at different spatial locations; and
   a left speaker and a right speaker communicatively coupled to the bi-directional communication device, the left speaker and the right speaker operable to convert and output the respective left audio output and right audio output as binaural sound.

2. The system of claim 1, wherein the bi-directional audio communication device is a push-to-talk (PTT) switch device.

3. The system of claim 1, wherein the bi-directional audio communication device is a computing device comprising one of:
   a cellphone,
   a radio,
   a smart device,
   a personal computer,
   a call center console, or
   a dashboard inside a vehicle or aircraft.

4. The system of claim 1, wherein the bi-directional audio communication device is a stereo communications headset.

5. The system of claim 1, wherein at least one of the plurality of incoming audio connectors is a wireless receiver.

6. The system of claim 1, wherein at least one of the plurality of incoming audio connectors is a wired connector.

7. The system of claim 1, wherein each of the different spatial locations is a predetermined spatial location.

8. The system of claim 7, wherein each of the different spatial locations corresponds with a different one of the plurality of incoming audio connectors.

9. The system of claim 7, wherein each of the different spatial locations is selectable by user control in 360-degrees in both vertical and horizontal planes.

10. The system of claim 7, wherein each of the different spatial locations is selectable by user control based on a perceived distance from a user.

11. The system of claim 7, wherein each of the different spatial locations are provided at default fixed positions reconfigurable by user control.

12. The system of claim 7, wherein each of the different spatial locations is selectable by user control via an application comprising a user interface residing on a remote device communicating with the audio processing unit.

13. The system of claim 7, wherein at least one of the different spatial locations is defined by at least one of the plurality of additional bi-directional audio communication devices.

14. The system of claim 13, wherein:
the at least one of the plurality of additional bi-directional audio communication devices is configured to include a priority level with the incoming audio stream; and
the audio processing unit is configured to assign the at least one of the different spatial locations based on the priority level.

15. The system of claim 1, wherein:
the plurality of incoming audio connectors and the audio processing unit reside in a PTT switch device;
each of the different spatial locations is a predetermined spatial location; and
the PTT switch device is programmable by a user to define each of the different spatial locations.

16. The system of claim 1, wherein the audio processing unit is configured to dynamically allocate each of the different spatial locations.

17. The system of claim 16, wherein the audio processing unit is configured to dynamically allocate each of the different spatial locations based on a number of the incoming audio stream received at any one time.

18. The system of claim 16, wherein the audio processing unit is configured to dynamically allocate each of the different spatial locations by defining a primary audio position of the different spatial locations when only one of the plurality of additional bi-directional audio communication devices is present and subsequently assigning new positions of the different spatial locations for each subsequently connected one of the plurality of additional bi-directional audio communication devices.

19. The system of claim 16, wherein the audio processing unit is configured to dynamically allocate each of the different spatial locations based on a maximum audio positional separation.

20. The system of claim 1, wherein the plurality of additional bi-directional audio communication devices comprises at least one of:
a smartphone,
a land mobile radio (LMR), or
an intercom.

21. The system of claim 1, wherein the audio processing unit is configured to add spectral content for band-limited audio to the incoming audio stream.

22. The system of claim 1, wherein the audio processing unit is configured to one or both of:
perform a hearing test to customize the unique HRTFs based on an ability of a user to spatially localize sound and a unique head and ear morphology of the user, and
add custom frequency equalization to compensate for hearing loss of the user.

23. The system of claim 1, wherein the audio processing unit configured to apply the unique HRTFs is implemented in hardware.

* * * * *